US009727267B1

United States Patent
Sebastian et al.

(10) Patent No.: US 9,727,267 B1
(45) Date of Patent: Aug. 8, 2017

(54) POWER MANAGEMENT AND MONITORING FOR STORAGE DEVICES

(71) Applicant: Intel Corporation, Santa Clara, CA (US)

(72) Inventors: Donia Sebastian, Fair Oaks, CA (US); Simon D. Ramage, Vancouver (CA); Curtis A. Gittens, New Westminister (CA); Scott Nelson, Vancouver (CA); David B. Carlton, Oakland, CA (US); Kai-Uwe Schmidt, Vancouver (CA)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/277,524

(22) Filed: Sep. 27, 2016

(51) Int. Cl.
*G11C 5/14* (2006.01)
*G06F 3/06* (2006.01)

(52) U.S. Cl.
CPC ............ *G06F 3/0625* (2013.01); *G06F 3/061* (2013.01); *G06F 3/067* (2013.01); *G06F 3/0653* (2013.01); *G06F 3/0659* (2013.01); *G06F 3/0688* (2013.01)

(58) Field of Classification Search
CPC ..... G11C 2207/2227; G11C 5/14; G11C 7/00; G11C 7/1057
See application file for complete search history.

(56) References Cited

U.S. PATENT DOCUMENTS

| | | | | |
|---|---|---|---|---|
| 4,943,946 A * | 7/1990 | Brent | ...................... | G11C 7/00 365/189.12 |
| 4,959,774 A * | 9/1990 | Davis | ....................... | G06F 1/30 365/228 |
| 6,442,644 B1 * | 8/2002 | Gustavson | ......... | G06F 13/4243 365/194 |
| 7,797,398 B2 * | 9/2010 | Oishi | .................... | G06F 13/385 365/164 |
| 8,677,167 B2 * | 3/2014 | Kawakami | ............ | G06F 1/3221 365/226 |
| 2004/0264245 A1 * | 12/2004 | Matsubara | ........... | G11C 16/225 365/185.01 |
| 2005/0213387 A1 * | 9/2005 | Kubo | ..................... | G11O 5/145 365/185.21 |
| 2005/0259465 A1 * | 11/2005 | Yoshida | .............. | G06F 12/1408 365/185.03 |
| 2008/0219078 A1 * | 9/2008 | Kamiyama | ............ | G11O 5/143 365/226 |
| 2013/0148447 A1 * | 6/2013 | Shaeffer | ................... | G11C 5/14 365/189.17 |
| 2014/0328123 A1 * | 11/2014 | Birk | ...................... | G11C 16/10 365/185.03 |

* cited by examiner

*Primary Examiner* — Tuan T Nguyen
(74) *Attorney, Agent, or Firm* — Patent Capital Group

(57) ABSTRACT

In one embodiment, a command for a storage device may be received, wherein the command comprises a plurality of stages. Power for the plurality of stages of the command may be dynamically allocated, wherein power for a first stage of the command is allocated first, and power for each remaining stage of the command is allocated after a preceding stage is performed.

20 Claims, 7 Drawing Sheets

POWER MANAGEMENT AND MONITORING FOR STORAGE DEVICES

FIELD

The present disclosure relates in general to the field of computer systems, and more specifically, to power management and monitoring for storage devices.

BACKGROUND

A computer system may include a storage device for storing information associated with the computer system. For example, the computer system may include a processor, and the processor may execute software that utilizes the storage device, such as an operating system and/or other software applications. The software may request various operations involving the storage device, such as reading and writing data. Each operation performed by the storage device may require varying levels of power. In addition, the storage device may have a limited or fixed supply of available power.

BRIEF DESCRIPTION OF THE DRAWINGS

Like reference numbers and designations in the various drawings indicate like elements.

DETAILED DESCRIPTION

Although the drawings depict particular systems, components, and embodiments, the concepts of various embodiments are applicable to any suitable storage devices, processors, circuits, computer systems, and other devices or components. Examples of devices in which teachings of the present disclosure may be used include desktop computer systems, server computer systems, storage systems, handheld devices, tablets, other thin notebooks, system on a chip (SoC) devices, and embedded components. Some examples of handheld devices include cellular phones, digital cameras, personal digital assistants (PDAs), and handheld PCs. Embedded components may include microcontrollers, application specific integrated circuits (ASIC), digital signal processors (DSP), memory and storage devices, systems on a chip, network computers (NetPC), set-top boxes, network hubs, wide area network (WAN) switches, or any other component that can perform the functions and operations taught below. Various embodiments of the present disclosure may be used in any suitable computing environment, such as a personal computer, a server, a mainframe, a cloud computing service provider infrastructure, a datacenter, a communications service provider infrastructure (e.g., one or more portions of an Evolved Packet Core), or other environment comprising a group of computing devices.

Figure 1:
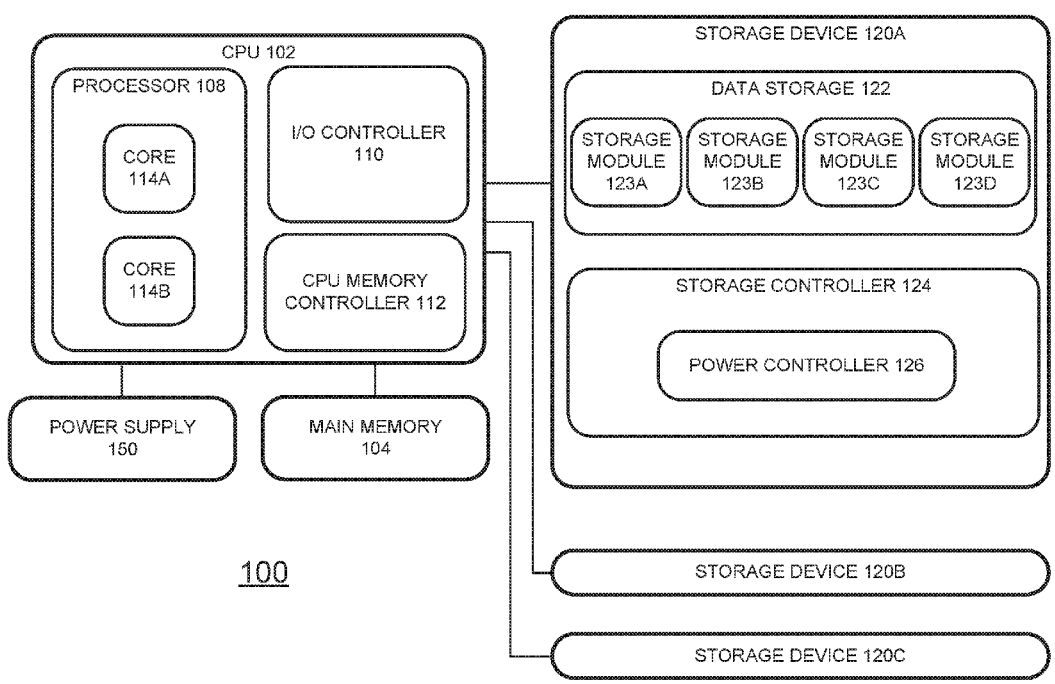
FIG. 1 illustrates a block diagram of a computer system with one or more storage devices in accordance with certain embodiments.

FIG. 1 illustrates a block diagram of a computer system 100 with one or more storage devices 120. In the illustrated embodiment, system 100 includes a central processing unit (CPU) 102 coupled to main memory 104, a plurality of storage devices 120A-C, and a power supply 150 for powering the system and its associated components.

During operation, the CPU 102 may request that data be read and/or written by the storage devices 120, and the storage devices 120 may perform the requisite operations in response. Storage devices 120, however, may be required to operate within a certain power envelope, such as the power envelope provided to a storage device 120 by its host system 100. Thus, a storage device 120 may be required to manage its active power to ensure that its operations are executed without exceeding the available power envelope. For example, a solid-state drive may perform various read, write, and erase operations on its underlying memory (e.g., NAND memory), and thus the solid-state drive may track the overall power budget and allocate power for those operations, as needed.

Solid-state drives can allocate and release power in a single-stage for each operation that is performed. For example, solid-state drives could allocate power once at the beginning of an operation and then release that power when the operation completes. However, the operations performed by a solid-state drive (e.g., read and write operations on NAND memory) may include multiple phases that each require varying levels of power, and the entire amount of power allocated for an operation may not be needed for all stages of the operation. Accordingly, a storage device that uses single-stage power allocation may manage power inefficiently, which may lead to lower performance.

As described throughout this disclosure, multi-stage power management may be used to manage power more efficiently for a storage device 120. Multi-stage power management is a power allocation scheme that may allocate power dynamically or separately for each stage of an operation. For example, read and write operations for NAND memory of a solid-state drive may include multiple stages. A read operation may include a first stage that reads data from NAND memory, and a second stage that outputs the data. A write (or program) operation may include a first stage that obtains input data, and a second stage that writes the data to NAND memory. In certain embodiments, different levels of power may be allocated for these various stages of read and write operations for NAND memory. In addition, in certain embodiments, power can be requested and allocated in a manner that avoids and/or minimizes any deadlock when high volumes of operations are being performed in parallel. For example, if multiple pending operations have completed their first stage and are waiting for an increased power allocation for their second stage, but no power is currently available, then those operations could be deadlocked if they are all waiting for additional power to be allocated without releasing their current allocation of power. As described throughout this disclosure, however, deadlock may be avoided through various rules and policies for allocating power.

Multi-stage power management may be particularly beneficial for storage devices that connect to their host systems using M.2 interfaces. M.2 is an interface specification for mounting computer expansion cards (e.g., solid-state drives)

with a flexible physical specification that supports different module widths and lengths. M.2 has a smaller and more flexible physical specification and other advanced interfacing features that render it particularly suitable in small and/or space-constrained devices, such as all-in-one desktops, laptops, tablets, and other mobile or portable devices. As a result, M.2 interfaces are often used in power-constrained devices. Accordingly, multi-stage power management may be particularly beneficial for storage devices with M.2 interfaces, where the active power available to a storage device 120 is low.

As an example, on a 2 terabyte (TB) solid-state drive with an M.2 interface, 6 NAND channels, and a 6 watt (W) power envelope, single-stage power allocation methods may result in approximately 425 milliwatts (mW) less power available for write operations, due to allocating power for read operations that must be sufficient for all stages of a read operation. This translates to approximately 170 megabytes (MB) of lost write bandwidth if single-stage power allocation is used, which is regained when using multi-stage power allocation. This gain in write bandwidth is approximately doubled for a solid-state drive of the same density but with 12 NAND channels and an 8 W power envelope.

In addition, as described throughout this disclosure, device-aware power monitoring may be used to accurately monitor and report the power usage of a storage device 120, and throttle the power usage of the storage device 120 when appropriate. Throttling the power usage of the storage device, for example, may involve regulating or adjusting the available power in order to lower the overall power usage of the storage device. The components of storage devices 120 that contribute the most to the average power consumption may vary for different workloads and operations. For example, when high capacity storage devices 120 perform operations to read and write data, those operations include units of work that may be performed in parallel, singular and sequentially, or anywhere between those extremes. Moreover, the various types of work units each perform unique functions and consume varying levels of power. For example, at a given time, the workload of a storage device 120 could include the following types of operations and/or work units: 10 memory reads, 5 memory programs (i.e., writes), 8 data transfer operations, 2 memory erases, and 1 activation of an error correction engine. The overall average power of the storage device 120 depends on the number and type of operations and associated work units that are performed.

Storage devices are often power constrained (e.g., solid-state drives and other non-volatile storage devices) and some may be targeted for markets that are trending towards low-cost and low-power systems. Accordingly, some storage devices may monitor and regulate their power usage. For example, a storage device could monitor the power and performance associated with storage related operations (e.g., operations that involve storage access), without tracking the dynamic power usage of other non-storage related operations and the device as a whole (which typically accounts for approximately 25-50% of the overall power of a storage device). That type of limited power monitoring could be used to approximate the average power of a storage device, for example, using the actual power monitored for the storage related operations, along with a static assumption of the worst-case workload for the other types of operations that are not monitored (e.g., in lieu of actually monitoring the power for those other non-storage related operations). That limited power monitoring approach, however, would not accurately track the average power of a storage device, particularly when the storage device is not operating at the static worst-case assumption used to approximate power usage for the non-storage related operations. The inaccuracy of that limited power monitoring approach leads to the potential for overly aggressive power throttling, which in turn reduces the performance of storage devices, and also hinders them from reporting average power statistics that are accurate to within +/−1 watt (W), as required by industry specifications. In addition, that limited power monitoring approach does not enable a storage device to be aware of or report the dynamically changing workload for any non-storage related operations, such as input/output (I/O) operations, system events (e.g., error-correction, encryption), and any other operations that do not involve storage access.

As described throughout this disclosure, device-aware power monitoring may be used to accurately monitor and report the power usage of storage devices 120, and throttle the power usage of storage devices 120 when appropriate. Device-aware power monitoring, for example, may enable monitoring of the dynamically changing workload and power for all types of operations and work units of a storage device 120. For example, a solid-state drive may include an interface, a controller, and a media array for storing data (e.g., an array of memory cells, such as NAND-based memory cells), among other components. Device-aware power monitoring may be used to track all operations performed by the various components of the solid-state drive, including the number of media array read operations, media array write operations, media array erase operations, data transfer operations (e.g., I/O operations), and system events or other non-media operations. Thus, device-aware power monitoring enables accurate tracking of the full system power of storage devices 120 by monitoring all workload types and amounts, which improves the accuracy of the statistical reporting to end users, and allows throttling to be selectively performed only when necessary. In addition, device-aware power monitoring enables accurate power monitoring without using a static worst case assumption to calculate power usage, and without adding costly external power sensing components.

The power management and monitoring functionality described throughout this disclosure provides numerous technical advantages, including more efficient power management that minimizes deadlock and maximizes the performance of storage devices 120, such as solid-state drives. This is particularly beneficial for storage devices 120 with limited power, such as storage devices that connect to power-constrained host systems using M.2 interfaces, where the operations performed by the storage device may be limited by the available power. In addition, this solution is also particularly beneficial for storage devices 120 that use different levels of power for various stages of an operation, such as solid-state drives of high densities where the NAND channel I/O power is greater than the NAND array power. Moreover, device-aware power monitoring enables the full power of storage devices to be accurately tracked and reported, allowing throttling to be performed more selectively to avoid degradations in performance from overly aggressive throttling, and achieving cost-savings from providing accurate power monitoring without costly external power sensing components.

The power management and monitoring functionality described throughout this disclosure may be implemented, for example, by storage devices 120 of system 100. In the illustrated embodiment, system 100 includes CPU 102, main memory 104, storage devices 120A-C, and power supply 150, as described further below.

CPU 102 comprises a processor 108, such as a microprocessor, an embedded processor, a digital signal processor (DSP), a network processor, a handheld processor, an application processor, a co-processor, a system on a chip (SoC), or other device to execute code (i.e., software instructions). Processor 108, in the illustrated embodiment, includes two processing elements (cores 114A and 114B in the illustrated embodiment), which may include asymmetric processing elements or symmetric processing elements. However, a processor may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core 114 may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet, a core and a hardware thread are often viewed by an operating system as individual logical processors, where the operating system is able to individually schedule operations on each logical processor.

In various embodiments, the processing elements may also include one or more arithmetic logic units (ALUs), floating point units (FPUs), caches, instruction pipelines, interrupt handling hardware, registers, or other hardware to facilitate the operations of the processing elements.

I/O controller 110 is a controller that includes logic to facilitate communication between CPU 102 and I/O devices (e.g., storage devices 120). I/O controller 110 may be, for example, an internal I/O controller integrated with CPU 102, an external I/O controller separate from CPU 102, and/or a combination of internal and external I/O controllers. I/O controller 110 may interact with any I/O device capable of transferring data to, and/or receiving data from, an electronic system such as CPU 102. I/O devices may include, for example, data storage devices (e.g., storage devices 120), wireless transceivers, network interfaces, network processors, audio/video (A/V) devices, monitors, mice, keyboards, printers, scanners, and/or any other suitable input or output device. In the illustrated embodiment, I/O controller 110 may facilitate communication between CPU 102 and storage devices 120. For example, CPU 102 may use I/O controller 110 to read data from a storage device 120 or write data to a storage device 120 (e.g., by issuing commands to read and write data at particular addresses or locations on the storage device 120).

An I/O device may communicate with the I/O controller 110 of the CPU 102 using any suitable interface and/or signaling protocol, such as M.2 interfaces, peripheral component interconnect (PCI), PCI Express (PCIe), Universal Serial Bus (USB), Serial Attached SCSI (SAS), Serial ATA (SATA), Fibre Channel (FC), IEEE 802.3, IEEE 802.11, logical device interface specifications such as Non-Volatile Memory Express (NVMe) (e.g., as described by specification(s) available at www.nvmexpress.org/specifications/) or the Advanced Host Controller Interface (AHCI) (e.g., the Serial ATA AHCI Specification, Rev. 1.3.1 available at http://www.intel.com/content/www/us/en/io/serial-ata/serial-ata-ahci-spec-rev1-3-1.html), or any other current or future interface or signaling protocol. In various embodiments, I/O devices coupled to the I/O controller 110 may be located off-chip (i.e., not on the same chip as CPU 102) or may be integrated on the same chip as the CPU 102.

CPU memory controller 112 may be a controller that includes logic for managing the flow of data going to and from main memory 104 of computing system 100. Main memory 104 may include any of a wide variety of memories, including but not limited to, random access memory (RAM) (e.g., dynamic random access memory (DRAM), synchronous dynamic random access memory (SDRAM), static random access memory (SRAM)), read only memory (ROM), logic blocks of a field programmable gate array (FPGA), erasable programmable read only memory (EPROM), electrically erasable programmable ROM (EEPROM), and/or any suitable combination of the foregoing. CPU memory controller 112 may include logic to read from main memory 104, write to main memory 104, and/or request other operations for main memory 104. In some embodiments, CPU memory controller 112 may be implemented on the same chip as CPU 102, whereas in other embodiments, CPU memory controller 112 may be implemented on a different chip than that of CPU 102.

Power supply 150 may include any component used to supply power to system 100 and/or its associated components, such as alternating current (AC) power sources (e.g., electrical outlets) and direct current (DC) power sources (e.g., batteries). Power supply 150 may be coupled, directly or indirectly, to CPU 102 and/or processor 108, storage devices 120, and/or any other component of system 100.

Storage devices 120A-C may include any suitable devices for storing data. For example, in some embodiments, a storage device 120 may be a device with non-volatile storage for persistently storing data, such as a solid-state drive, flash-based memory device, and/or hard disk drive. Storage devices 120 may be used, for example, to store data associated with files and programs of computer system 100 (e.g., user files, code for software applications). In some embodiments, a storage device 120 may be dedicated to a particular CPU 102 and/or shared with other CPUs or devices.

Storage devices 120 may include any type or combination of non-volatile and/or volatile storage. Non-volatile storage is a storage medium that retains data even without power. Non-limiting examples of non-volatile storage may include any or a combination of: solid-state storage (e.g., any form of persistent flash memory, including planar or three dimensional (3D) NAND flash memory or NOR flash memory), 3D crosspoint (or 3D XPoint) memory, storage devices that use chalcogenide phase change material (e.g., chalcogenide glass), byte addressable non-volatile memory devices, ferroelectric memory, silicon-oxide-nitride-oxide-silicon (SONOS) memory, polymer memory (e.g., ferroelectric polymer memory), ferroelectric transistor random access memory (Fe-TRAM) ovonic memory, nanowire memory, electrically erasable programmable read-only memory (EEPROM), and/ or various other types of non-volatile random access memories (RAM). In particular embodiments, a storage device 120 with non-volatile storage may comply with one or more standards promulgated by the Joint Electron Device Engineering Council (JEDEC), such as JESD218, JESD219, JESD220-1, JESD223B, JESD223-1, or other suitable standard (the JEDEC standards cited herein are available at www.jedec.org). Storage devices 120 may also include any type or combination of volatile storage 122. Volatile storage is a storage medium that requires power to retain data. Examples of volatile storage may include various types of random access memory (RAM), such as dynamic random access memory (DRAM), synchronous dynamic random access memory (SDRAM), and static random access memory (SRAM). In particular embodiments, storage devices 120 with DRAM may comply with a standard promulgated by JEDEC, such as JESD79F for Double Data Rate (DDR) SDRAM, JESD79-2F for DDR2 SDRAM, JESD79-3F for DDR3 SDRAM, or JESD79-4A for DDR4 SDRAM (these standards are available at www.jedec.org). Such standards (and similar standards) may be referred to as Double Data Rate (DDR) based standards, and communication interfaces of storage devices 120 that implement such standards may be referred to as DDR-based interfaces.

In the illustrated embodiment, storage device 120A includes data storage 122, storage controller 124, and power controller 126. Data storage 122 comprises a plurality of storage modules 123A-D. A storage module 123 may be any component or mechanism capable of storing data, including any type or combination of non-volatile and/or volatile storage. For example, in some embodiments, storage modules 123 may include: memory chips, dies, and modules (e.g., flash-based memory chips, RAM chips, dual in-line memory modules (DIMM)); memory cells on a chip, die, or module (e.g., NAND, NOR, and other flash-based memory cells, RAM memory cells); and/or magnetic and optical storage mediums (e.g., disks or platters of a hard disk drive). In various embodiments, data storage 122 may include any suitable number, type, and arrangement of storage modules 123. For example, a storage module 123 could be a flash-based memory chip with a plurality of memory cells that are each operable to store one or more bits. In various embodiments, storage modules 123 (and/or the underlying memory cells) may be arranged or logically grouped into columns and rows, three-dimensional structures, channels, banks, blocks, pages (e.g., wherein a page is a subset of a block), frames, bytes, file segments, cylinders, tracks, sectors, or any other suitable arrangements or groupings.

Storage devices 120 may comprise any suitable type of storage and are not limited to any particular storage technology, speed, and/or form factor. Moreover, computer system 100 may include multiple different types of storage devices 120. For example, in some embodiments, computer system 100 may include tiered storage, such as a first tier of solid state drives and a second tier of hard disk drives. Storage devices 120 may communicate with I/O controller 110 using any suitable communication protocol, such as a DDR-based protocol, PCI, PCIe, USB, SAS, SATA, FC, System Management Bus (SMBus), or other suitable protocol. Storage devices 120 may also include a communication interface (e.g., an M.2 interface) to communicate with I/O controller 110 in accordance with any suitable logical device interface specification, such as NVMe, AHCI, or any other suitable specification. In particular embodiments, storage device 120 may comprise multiple communication interfaces that each communicate using a separate protocol with I/O controller 110.

Storage controller 124 may include logic to receive requests from CPU 102 (e.g., via I/O controller 110), cause the requests to be carried out with respect to data storage 122, and provide data associated with the requests to CPU 102 (e.g., via I/O controller 110). Storage controller 124 can be implemented on the same chip, board, or device as data storage 122 or on a different chip, board, or device. For example, in some embodiments, storage controller 124 may be a centralized controller that manages storage operations for multiple different storage devices 120 and/or data storages 122 (which may be of the same type or of different types).

Power controller 126 may include logic to manage power for the storage device 120. In the illustrated embodiment, the power controller 126 is shown as being part of the storage controller 124 of the storage device 120, although in certain embodiments the power controller 126 may be a separate component from (but communicatively coupled to) the storage controller 124. For example, in various embodiments, the power controller 126 may be integrated on the same chip as the storage controller 124 or on a different chip. In some embodiments, storage controller 124 and/or power controller 126 may implement the power management and monitoring functionality described throughout this disclosure.

In various embodiments, storage devices 120 may also include error-correction functionality. For example, in some embodiments, an error-correction engine may be included. The error-correction engine may be operable to detect and/or correct errors encountered in data during operation of the storage device 120. In various embodiments, the error-correction engine may be included within the storage controller 124 or may be communicably coupled to the storage controller 124. For example, in some embodiments, the error-correction engine may be integrated on the same chip as the storage controller 124 or may be implemented on a different chip.

In various embodiments, storage devices 120 may also include encryption functionality. For example, in some embodiments, an encryption engine may be included. The encryption engine may be used to encrypt and decrypt data stored by the storage device. For example, the encryption engine may be operable to receive data associated with a write command, encrypt the data, and provide the encrypted data to be written to data storage 122. In some embodiments, the encrypted data may be the same length as the original data in order to simplify the logical to physical mappings of data. The encryption engine may also be operable to receive encrypted data retrieved from data storage 122, decrypt the data into its original form (e.g., as originally received from CPU 102), and provide the decrypted data for transmission to CPU 102 or another requesting entity (e.g., in response to a command to read data). In various embodiments, the encryption engine may be included within the storage controller 124 or may be communicably coupled to the storage controller 124. For example, in some embodiments, the encryption engine may be integrated on the same chip as the storage controller 124 or may be implemented on a different chip. In certain embodiments, the computing host may not need to manage encryption and decryption of data stored on storage device 120 when the encryption functionality is managed by storage device 120.

In some embodiments, all or some of the elements of system 100 may be resident on (or coupled to) the same circuit board (e.g., a motherboard). In various embodiments, any suitable partitioning between the elements may exist. For example, the illustrated elements of CPU 102 may be located on a single die or package (i.e., on-chip) or any of the elements of CPU 102 may be located off-chip. Similarly, the illustrated elements of storage device 120A may be located on a single chip or on multiple chips. In various embodiments, a storage device 120 and its computing host (e.g., CPU 102) may be located on the same circuit board or on the same device, while in other embodiments the storage device 120 and the computing host may be located on different circuit boards or devices.

The components of system 100 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g. cache coherent) bus, a layered protocol architecture, a differential bus, and a Gunning transceiver logic (GTL) bus. In various embodiments an integrated I/O subsystem includes point-to-point multiplexing logic between various components of system 100, such as cores 114, one or more CPU memory controllers 112, I/O controller 110, integrated I/O devices, direct memory access (DMA) logic (not shown), etc. In various embodiments, components of computer system 100 may be coupled together through one or more networks comprising any number of intervening network nodes, such as routers, switches, or other computing devices. For example, a computing host (e.g., CPU 102) and the storage device 120 may be communicatively coupled through a network. Although not depicted in the illustrated embodiment, system 100 may include a display to output data provided by CPU 102, a network interface to communicate over a network, and/or any other peripherals, interfaces, or components. In some embodiments, these components may be communicatively coupled to CPU 102.

Figure 2:
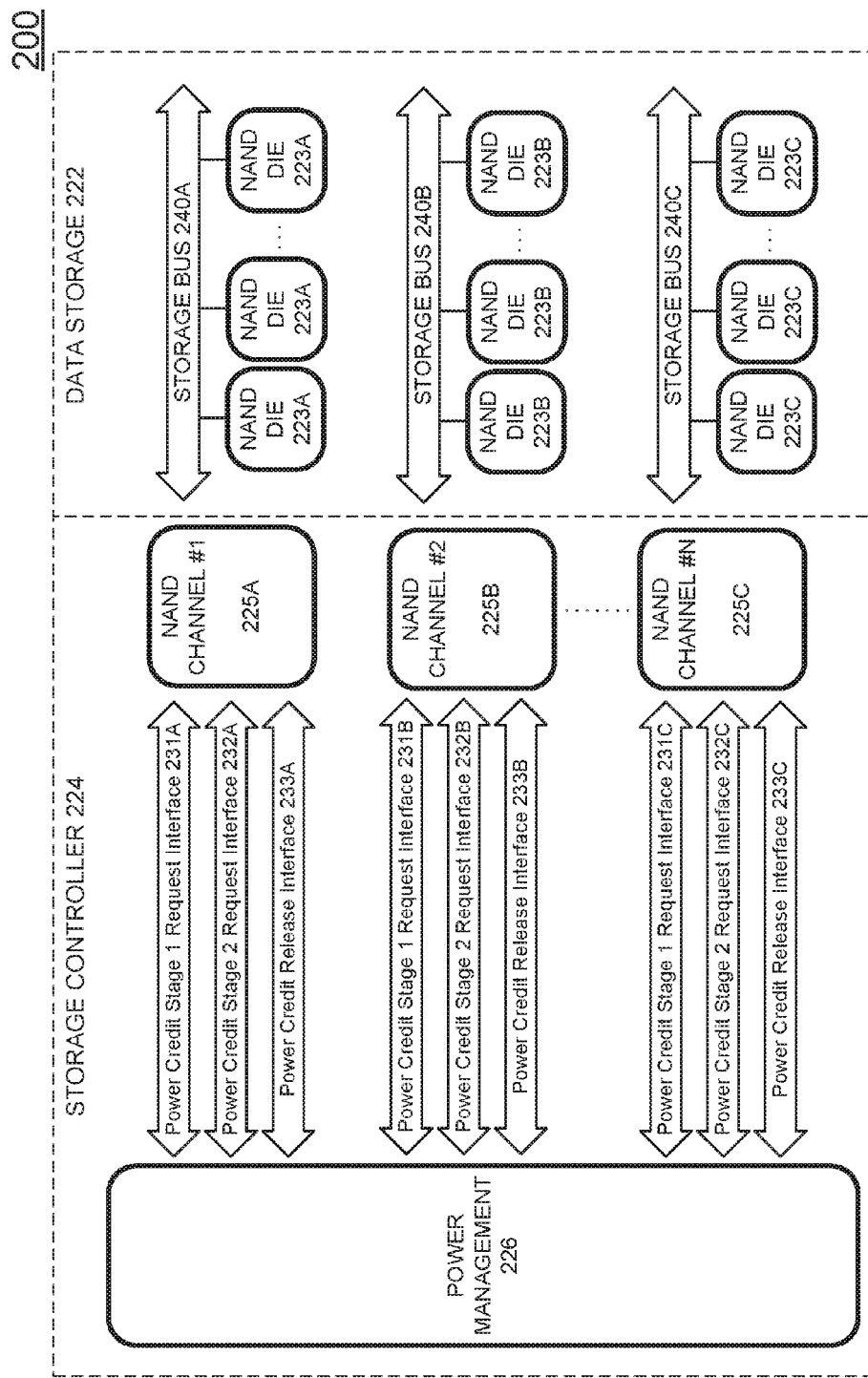
FIG. 2 illustrates an example embodiment of a storage device with multi-stage power management.

FIG. 2 illustrates an example embodiment of a storage device 200 with multi-stage power management. In some embodiments, storage device 200 may be used to implement the storage devices 120 of FIG. 1.

Storage device 200 may be, for example, a solid state drive. In the illustrated embodiment, storage device 200 includes a data storage 222 and a storage controller 224. The data storage 222 includes NAND dies 223 and storage buses 240. However, while the illustrated embodiment includes NAND dies 223, other embodiments may include any other type or combination of non-volatile memory or storage. The storage controller 224 includes NAND channels 225, power management controller 226, and power management interfaces 231-233. In some embodiments, the storage controller 224 may be implemented using an application specific integrated circuit (ASIC), such as a solid-state drive controller that is implemented in the hardware and/or firmware of an ASIC.

The NAND dies 223 are memory chips that store data using NAND-based memory cells. The NAND dies 223 may be connected to the storage controller 224 using storage buses 240. In the illustrated embodiment, the NAND dies 223 are grouped into multiple NAND channels 225, and each channel 225 may be used to interact with its associated NAND dies 223 using the storage bus 240 for that channel. For example, the illustrated embodiment includes NAND channels 1-N (225A-225C), and each channel 225 is connected to a group of NAND dies (223A-223C) using a storage bus (240A-240C). The NAND channels 225 may allow the controller 224 to interact with multiple NAND dies 223 simultaneously.

The NAND channels 225 may be connected to a power management controller 226 that manages power for the storage device 200. In the illustrated embodiment, each NAND channel 225 is connected to the power management controller 226 using three interfaces: an interface 231 for requesting power credits for the first stage of an operation; an interface 232 for requesting power credits for the second stage of an operation; and an interface 233 for releasing power credits. Each interface 231-233 may be implemented using any suitable mechanism for enabling communication between a NAND channel 225 and power management controller 226 (e.g., to send and receive power credit requests, power credits, power credit releases, and/or any other power-related requests, commands, and responses). For example, in some embodiments, each interface 231-233 may be implemented using a single line or wire, multiple lines or wires, a bus, and/or any other mechanism that enables communication between a NAND channel 225 and power management controller 226.

The NAND channels 225 may request power credits from the power management controller 226 before performing read and write operations on the NAND dies 223. Read and write operations may include multiple stages, including an I/O stage and a media access stage. For example, a NAND die 223 may store data using a media array, which is an array of NAND-based memory cells. Read and write operations may include one stage to read from or write to the media array of a NAND die 223, and another stage to perform I/O. For example, a read operation may include a first stage that reads data from a media array on a NAND die 223, and a second stage that outputs the data. A write (or program) operation may include a first stage that obtains input data, and a second stage that writes the data to a media array on a NAND die 223.

Storage devices could use single-stage power management, which allocates and releases power only once for each read and write operation. However, that single-stage approach may result in inefficient allocations of power, as the I/O stage and the media access stage of NAND read and write operations have different power profiles. Moreover, because the power required for the I/O stage is dependent on the number of NAND dies 223 connected to each NAND channel 225, it may vary based on the density of the storage device 220.

Accordingly, storage device 200 uses multi-stage power management to allocate power more efficiently, for example, by dynamically allocating power for each stage of an operation. For example, multi-stage power management may allocate different levels of power for each stage of read and write operations. In addition, power can be allocated in a manner that avoids and/or minimizes deadlock when high volumes of operations are being performed in parallel. For example, if multiple pending operations have completed their first stage and are waiting for an increased power allocation for their second stage, but no power is currently available, then those operations could be deadlocked if they are all waiting for additional power to be allocated without releasing their current allocation of power. As described throughout this disclosure, however, deadlock may be avoided through various rules and policies for allocating power.

When using multi-stage power management to perform a command, such as a read or write operation, the command may first be received by storage controller 224 and/or by the appropriate NAND channel 225. The NAND channel 225 may then request a power credit from the power management controller 226 for the first stage of the operation. A power credit, for example, may be an allocation of power for a particular operation. Once the power credit has been provided, the NAND channel 225 (or any other component of storage controller 224) may then initiate performance of the first stage of the operation. After the first stage of the operation is performed, the NAND channel 225 may then request a power credit adjustment from the power management controller 226 for the second stage of the operation. Once the power credit adjustment has been provided, the NAND channel 225 (or any other component of storage controller 224) may then initiate performance of the second stage of the operation. After the second stage of the operation is performed, the NAND channel 225 may then release the power credit back to the power management controller 226.

Within the storage controller 224, multiple NAND channels 225 can be concurrently requesting power credits from the power management controller 226. In addition, within a given NAND channel 225, there may be multiple pending read and write operations that are being allocated power credits for a particular stage or are having power credits released. Accordingly, deadlocks can potentially occur due to the concurrent usage model of multi-stage power management. In order to prevent deadlock from occurring, separate interfaces may be used to request power credits for each stage of an operation. For example, in the illustrated embodiment, power credits for the first stage of an operation are requested using interface 231, power credits for the second stage of an operation are requested using interface 232, and power credits are released for an operation using interface 233. In addition, certain rules and policies may be enforced to prevent deadlock.

First, the power credit interfaces (231 and 232) may each support a single outstanding power credit request from a NAND channel 225 to the power management controller 226. If a request is pending on a power credit interface and is stalled waiting for the power management controller 226 to respond, a NAND channel 225 may wait to send any new power credit requests on that interface until the outstanding request is completed by the power management controller 226.

Second, if a NAND channel 225 has stage 1 and stage 2 power credits to request for various operations, the NAND channel may send the stage 2 request on the stage 2 interface (interface 232) before sending the stage 1 request on the stage 1 interface (interface 231).

Third, power credit releases may be sent from a NAND channel 225 to the power management controller 226 at any time using the power credit release interface 233, regardless of whether there are pending power credit requests on power credit interfaces 231 and 232.

Finally, if stage 1 of an operation completes and that operation is ready for a stage 2 power credit adjustment, but another stage 2 request is already pending on interface 232, the power credit for the recently completed stage 1 may be released entirely instead of requesting a stage 2 power credit adjustment, allowing the pending stage 2 request to complete using the power that is released. After the pending stage 2 request completes, a stage 2 power credit may then be requested for the operation whose stage 1 power credit was released. For example, if a NAND channel 225 determines that stage 1 of a read operation (i.e., the media read stage) completes while another stage 2 request is already pending on interface 232, the NAND channel may forego the stage 2 power credit adjustment for the read operation and instead release its stage 1 power credit, allowing the pending stage 2 request for the other operation to complete. The NAND channel 225 may then request a power credit for stage 2 of the read operation (i.e., the I/O stage). Thus, rather than adjusting the stage 1 power credit of the read operation for stage 2 when another stage 2 request is already pending, the stage 1 power credit is released entirely and a new power credit is subsequently requested for stage 2.

Moreover, in some embodiments, the power management controller 226 may use an arbitration scheme to process the pending power credit requests and releases sent from multiple NAND channels 225. First, before processing any stage 1 or stage 2 requests, the power management controller 226 may process all pending power credit releases sent using the power credit release interfaces 233. Next, the power management controller 226 may process all pending stage 2 power credit requests that were sent using the stage 2 request interfaces 232. In some embodiments, the power management controller 226 may use a round-robin arbitration scheme to cycle through each NAND channel 225 and process any pending stage 2 request sent by each NAND channel 225. Next, the power management controller 226 may process all pending stage 1 power credit requests that were sent using the stage 1 request interfaces 231. In some embodiments, the power management controller 226 may use a round-robin arbitration scheme to cycle through each NAND channel 225 and process any pending stage 1 request sent by each NAND channel 225.

Figures 3A, 3B:
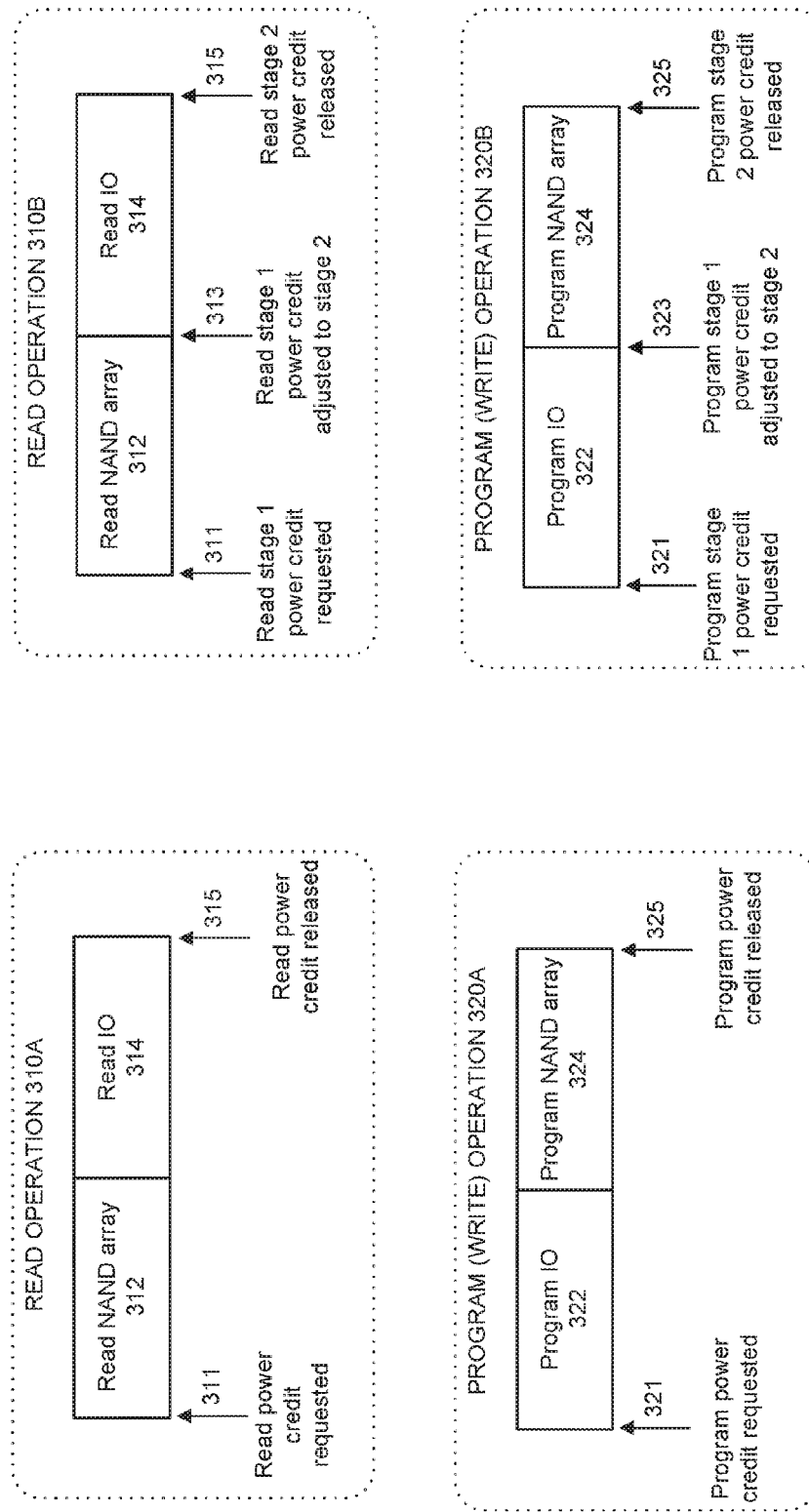
FIG. 3A illustrates example operations performed by a storage device with single-stage power management.
FIG. 3B illustrates example operations performed by a storage device with multi-stage power management.

FIGS. 3A and 3B illustrate example read and program (write) operations performed by a storage device. In FIG. 3A, the example operations are performed by a storage device with single-stage power management. In FIG. 3B, the same example operations are performed by a storage device with multi-stage power management.

FIG. 3A illustrates a read operation 310A and a program (i.e., write) operation 320A using single-stage power management. The read operation 310A includes two stages: a first stage 312 to read the NAND array, and a second stage 314 to perform the I/O for the read operation. Using single-stage power management, a power credit is requested 311 for the entire read operation 310A before performing the first stage. The first stage 312 and the second stage 314 of the read operation 310A are then performed using the power credit allocated for the read operation. After both stages of the read operation 310A are complete, the power credit is then released 315 for the read operation. Similarly, the program (or write) operation 320A includes two stages: a first stage 322 to perform the I/O for the program operation (i.e., obtain the data to write to memory), and a second stage 324 to program the data to the NAND array. Using single-stage power management, a power credit is requested 321 for the entire program operation 320A before performing the first stage. The first stage 322 and the second stage 324 of the program operation 320A are then performed using the power credit allocated for the program operation. After both stages of the program operation 320A are complete, the power credit is then released 325 for the program operation.

FIG. 3B illustrates a read operation 310B and a program (i.e., write) operation 320B using multi-stage power management. The read operation 310B from FIG. 3B includes the same two stages as the read operation 310A from FIG. 3A. However, using multi-stage power management, a power credit is requested 311 for stage 1 of the read operation 310B. The first stage 312 of the read operation 310B is then performed. After the first stage 312 of the read operation 310B is complete, the power credit for stage 1 is adjusted 313 for stage 2. The second stage 314 of the read operation 310B is then performed. After the second stage 314 of the read operation 310B is complete, the power credit for stage 2 of the read operation is released 315.

Similarly, the program (write) operation 320B from FIG. 3B includes the same two stages as the program operation 320A from FIG. 3A. However, using multi-stage power management, a power credit is requested 321 for stage 1 of the program operation 320B. The first stage 322 of the program operation 320B is then performed. After the first stage 322 of the program operation 320B is complete, the power credit for stage 1 is adjusted 323 for stage 2. The second stage 324 of the program operation 320B is then performed. After the second stage 324 of the program operation 320B is complete, the power credit for stage 2 of the program operation is released 325.

Figure 4:
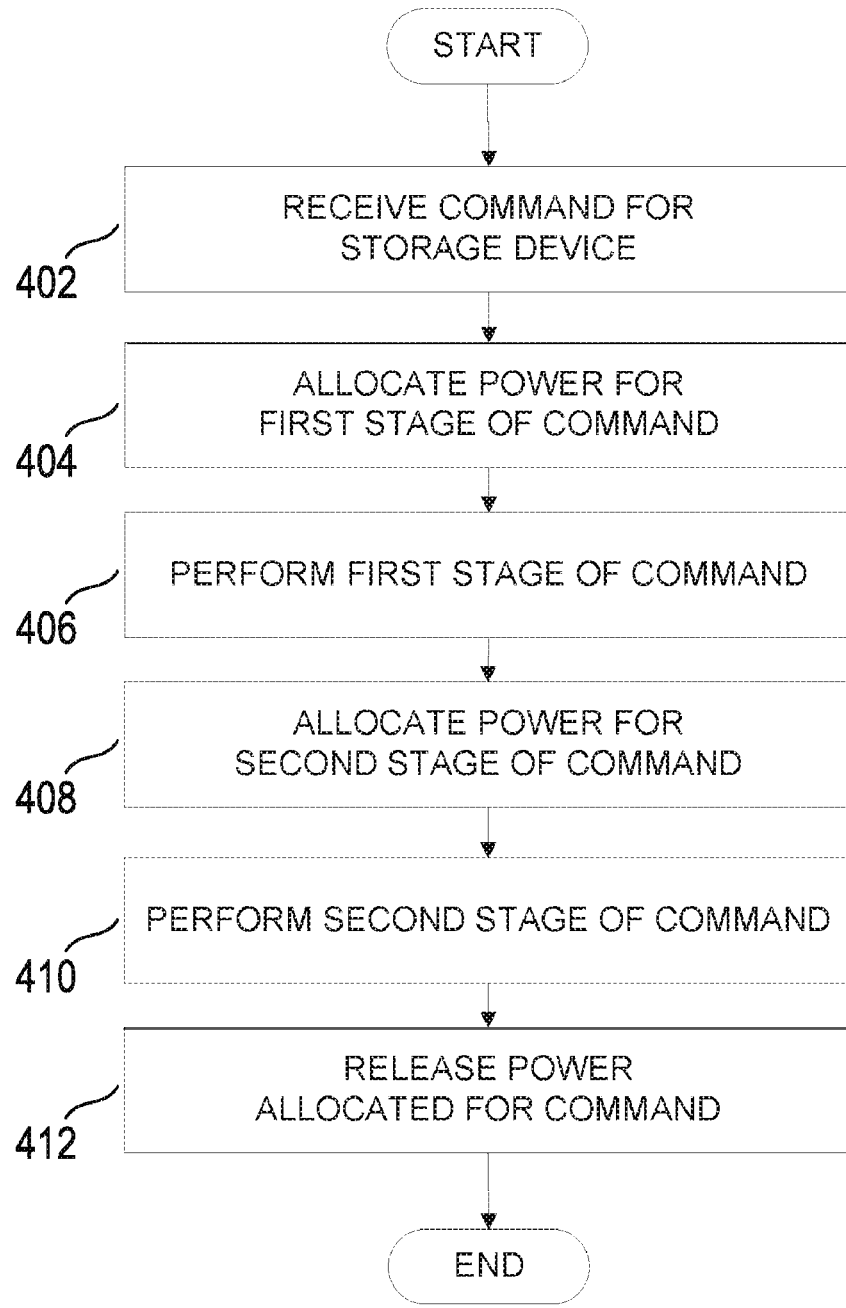
FIG. 4 illustrates a flow diagram for an example embodiment of multi-stage power management for a storage device.

FIG. 4 illustrates a flow diagram 400 for an example embodiment of multi-stage power management for a storage device. The flow diagram 400 depicts example operations that may be performed by any suitable logic and/or components, including the components described throughout this disclosure (e.g., storage devices 120 of FIG. 1, storage device 200 of FIG. 2, and/or storage device 500 of FIG. 5).

The flow diagram may begin at block 402 by receiving a command for a storage device. The storage device, for example, may be a solid-state drive with non-volatile memory. The command could be, for example, a read operation or a program (i.e., write) operation. The command, such as a read operation or a program operation, may include multiple stages. For example, a read operation may include a first stage to read data from a NAND array and a second stage to output the data. Similarly, a program (i.e., write) operation may include a first stage to obtain data to store in the storage device and a second stage to write the data to a NAND array.

The flow diagram may then proceed to block 404 to allocate power for the first stage of the command. In some embodiments, however, power may be allocated for the first stage of the command only after allocating power for a second stage of one or more pending commands. The flow diagram may then proceed to block 406 to perform the first stage of the command using the power allocated in block 404.

The flow diagram may then proceed to block 408 to allocate power for the second stage of the command. In some embodiments, allocating power for the second stage may comprise adjusting the power that was allocated for the first stage. In addition, in some embodiments, separate interfaces may be used to allocate power for the first stage and the second stage of the command. Finally, in some embodiments, it may be determined that another power allocation request is pending for a second stage of a different pending command. In those embodiments, the power allocated at block 404 for the first stage of the current command may be released, and power may then be allocated for the second stage of the other pending command. Once the second stage of the other command completes and that power is released, power may then be allocated for the second stage of the current command.

The flow diagram may then proceed to block 410 to perform the second stage of the command using the power allocated in block 408.

The flow diagram may then proceed to block 412 to release power for the command. For example, the power allocated (or adjusted) for the second stage of the command may be released. In some embodiments, power may be released for the command using an interface that is different from the interface(s) used to allocate power for the command. In some embodiments, power allocated and released for each command and/or other operations may also be tracked (e.g., using an accumulator) for monitoring, reporting, and/or throttling purposes.

At this point, the flow diagram may be complete. In some embodiments, however, the flow diagram may restart and/or certain blocks may be repeated. For example, in some embodiments, the flow diagram may restart at block 402 to continue processing commands for the storage device.

The flow diagram described in FIG. 4 is merely representative of operations that may occur in particular embodiments. In other embodiments, additional operations may be performed and/or certain operations may be omitted. Various embodiments of the present disclosure contemplate any suitable mechanisms for accomplishing the functions described herein. Some of the operations illustrated in the flow diagram of FIG. 4 may be repeated, combined, modified, and/or deleted where appropriate. Additionally, operations may be performed in any suitable order without departing from the scope of particular embodiments.

Figure 5:
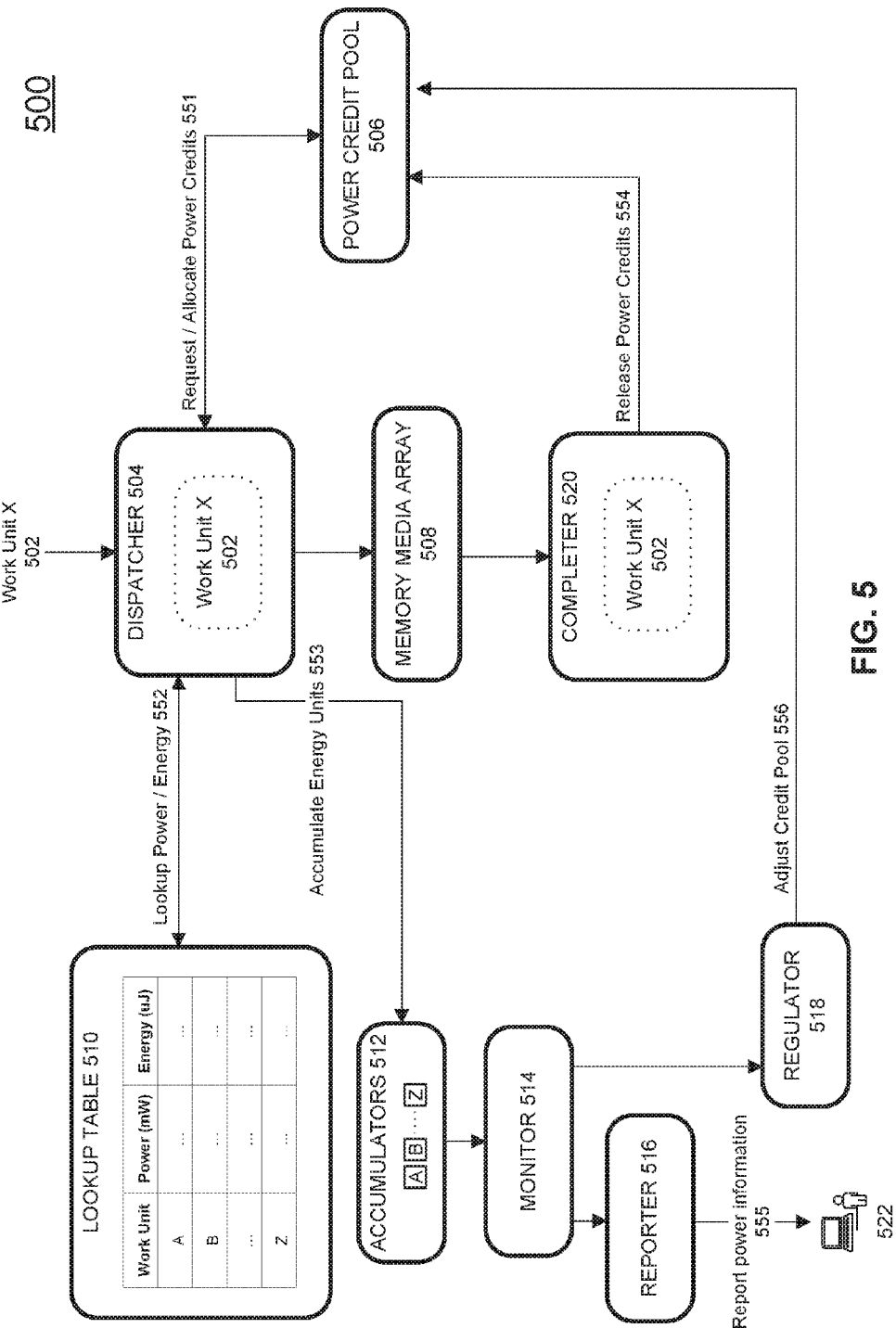
FIG. 5 illustrates an example embodiment of a storage device with device-aware power monitoring.

FIG. 5 illustrates an example embodiment a storage device 500 with device-aware power monitoring. Storage device 500 may be, for example, a solid-state drive with non-volatile memory (NVM) 508. In some embodiments, storage device 500 may be used to implement the storage devices 120 of FIG. 1.

A storage device could simply monitor and accumulate the total energy used for storage related operations (e.g., media array reads, media array programs, and media array erases) without monitoring and tracking the energy used for other types of operations or events (e.g., I/O operations, error-correction, encryption, and/or other system events). However, that power monitoring approach would be limited, as it would only enable monitoring of the power consumed by the storage or memory of a storage device (e.g., a media array) rather than the overall storage device as a whole, and it would not allow information to be retained about the type and quantity of each underlying unit of work performed by a storage device.

Accordingly, storage device 500 may include device-aware power monitoring that accurately monitors all power used by the storage device. Device-aware power monitoring, for example, may enable monitoring of the type and quantity of each work unit performed by the storage device 500. In some embodiments, for example, storage device 500 may implement an N-energy accumulator that maintains an individual accumulator for each type of work unit. Accumulating energy separately for each type of work unit enables storage device 500 to monitor and track power usage with more granularity than existing storage devices. Moreover, the full power usage of the storage device 500 may be accurately monitored by accumulating energy for all workload types, including workload types that are not tracked by existing storage devices (e.g., I/O operations, error-correction, encryption, and/or other system events).

In the illustrated embodiment, storage device 500 includes channels 525, dispatcher 504, power credit pool 506, non-volatile memory 508, power/energy lookup table 510, N-energy accumulator 512, power monitor 514, power reporter 516, power regulator 518, and completer 520.

Figure 6:
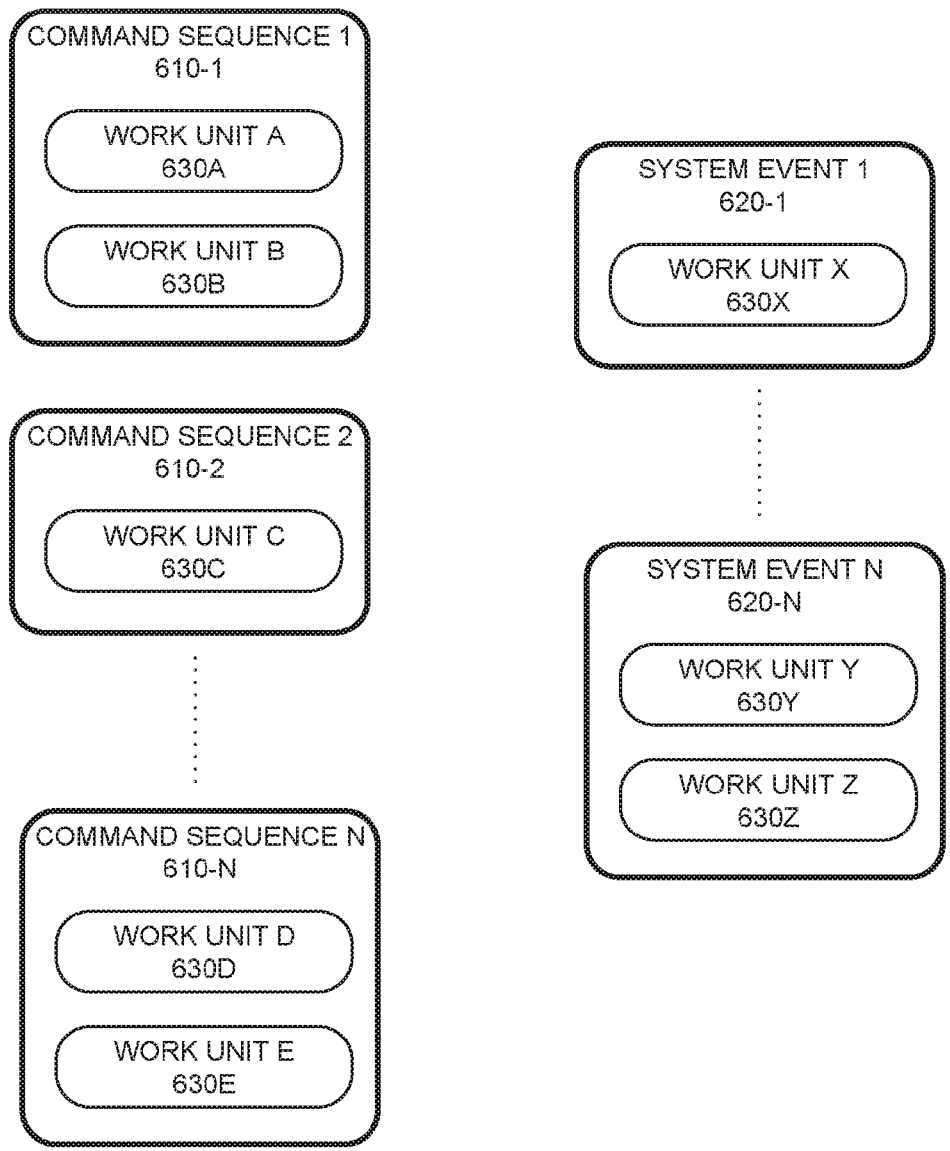
FIG. 6 illustrates example command sequences and system events for a storage device.

Storage device 500 may perform various operations associated with commands (e.g., read, program, erase) and/or system events. Each command sequence or system event may comprise one or more work units 502 corresponding to different stages of an operation (as illustrated in FIG. 6). In the illustrated embodiment, the work units 502 associated with various operations are being processed by the storage device 500. The work units 502, for example, may be associated with read/program/erase commands from one or more NVM channels 525 of the storage device 500 (e.g., NAND channels of a NAND-based storage device), or with system events triggered for the storage device 500.

Each work unit 502 may be processed initially by a dispatcher 504 of the storage device 500. In the illustrated embodiment, for example, work unit X 502 is being processed by dispatcher 504. Dispatcher 504 may use lookup table 510 to look up the quantum of power and/or energy 552 required for a particular type of work unit 502. For example, lookup table 510 may include a table that identifies the corresponding power and/or energy required for each type of work unit 502.

Dispatcher 504 may then signal the N-energy accumulator 512 to accumulate the energy units 553 required by the particular work unit 502. The N-energy accumulator 512, for example, may include a separate accumulator 513 for each type of work unit 502 that may be performed by the storage device 500. The N-energy accumulator 512 may include accumulators 513 for work units 502 that involve storage access (e.g., read, program, erase) and other work units 502 that do not directly involve storage access (e.g., I/O operations, system events). In this manner, the N-energy accumulator 512 may track the energy consumption for each type of work, along with its energy contribution to the entire storage device 500. For example, dispatcher 504 may notify the N-energy accumulator 512 that a particular type of work unit is being dispatched, allowing the N-energy accumulator 512 to increment the individual accumulator 513A-513Z for that work unit by the appropriate quantum of energy.

Dispatcher 504 may then request power credits 551 for the work unit 502 from the power credit pool 506. The power credit pool 506, for example, may be a quota of power credits used to allocate power for the work units 502 performed by the storage device 500. After the dispatcher 504 obtains a power credit for the current work unit 502, the work unit 502 may then be processed using the allocated power. For example, if the work unit 502 requires storage access, then the non-volatile memory 508 may be accessed. The non-volatile memory 508 may be, for example, flash memory, NAND, or any other form of solid-state or non-volatile storage. The work unit 502 may then be passed to the completer 520 to handle any remaining processing required for the work unit 502 (e.g., input/output (I/O) processing, error-correction). After all processing for the work unit 502 is complete, the completer 520 may then release the power credit 554 for that work unit 502 back to the power credit pool 506.

A power monitor 514 may be used to periodically check the energy values in the N-energy accumulator 512, and calculate the average power usage of the storage device 500 over a given time interval. Because the N-energy accumulator 512 maintains separate accumulators 513 for all work types, the average power calculated by power monitor 514 measures the full power usage of the storage device 500. The power monitor 514 may then provide the computed average power to power reporter 516 and power regulator 518.

Power reporter 516 may track and report power related information (e.g., average power), statistics, and/or events for the storage device 500. For example, power related information, statistics, and/or events may be reported 555 to a host computing system 522 and/or a user of the host computing system.

Power regulator 518 may be used, for example, to throttle the power usage of the storage device 500 when appropriate. For example, power regulator 518 may evaluate the average power calculated by power monitor 514, compare the average power to a set target power (e.g., an average power usage goal), and perform a real-time calibration 556 of the size of the power credit pool 506 in order to achieve the target power. Together, power monitor 514 and power regulator 518 may form a closed-loop control system.

FIG. 6 illustrates examples 600 of command sequences 610 and system events 620 for a storage device. Command sequences 610 and system events 620 may be processed, for example, by storage device 500 of FIG. 5.

Command sequences 610 may be, for example, sequences of commands associated with read, program, and/or erase operations. System events 620 may be, for example, events that are triggered for a storage device, such as an error-correction algorithm. Each command sequence 610 or system event 620 may comprise one or more work units 630 corresponding to different stages of a particular command and/or event.

The illustrated examples 600 includes command sequences 1 to N (610-1 to 610-N). Command sequence 1 (610-1) includes work unit A (630A) and work unit B (630B). Command sequence 1 may correspond to a read operation, for example, where work unit A reads data from memory, and work unit B performs an I/O transfer of the data read from memory. Command sequence 2 (610-2) includes work unit C (630C). Command sequence 2 may correspond to an erase operation, for example, where work unit C erases a particular memory location. Command sequence N (610-N) includes work unit D (630D) and work unit E (630E). Command sequence N may correspond to a program (or write) operation, for example, where work unit D performs an I/O operation to obtain the data to write to memory, and work unit E writes that data to memory.

The illustrated examples 600 also includes system events 1 to N (620-1 to 620-N). System event 1 (620-1) includes work unit X (630X). System event 1 may correspond to an error-correction event, for example, where work unit X performs an error-correction algorithm. System event N (620-N) includes work unit Y (630Y) and work unit Z (630Z). System event N may correspond to a power reporting event, for example, where work unit Y calculates the average power of the storage device and work unit Z performs an I/O operation to report the average power to a host computing system and/or user.

In some embodiments, the power and/or energy required by each work unit of the example command sequences 610 and system events 620 may be monitored and/or tracked by a storage device, for example, as described in connection with storage device 500 of FIG. 5.

Figure 7:
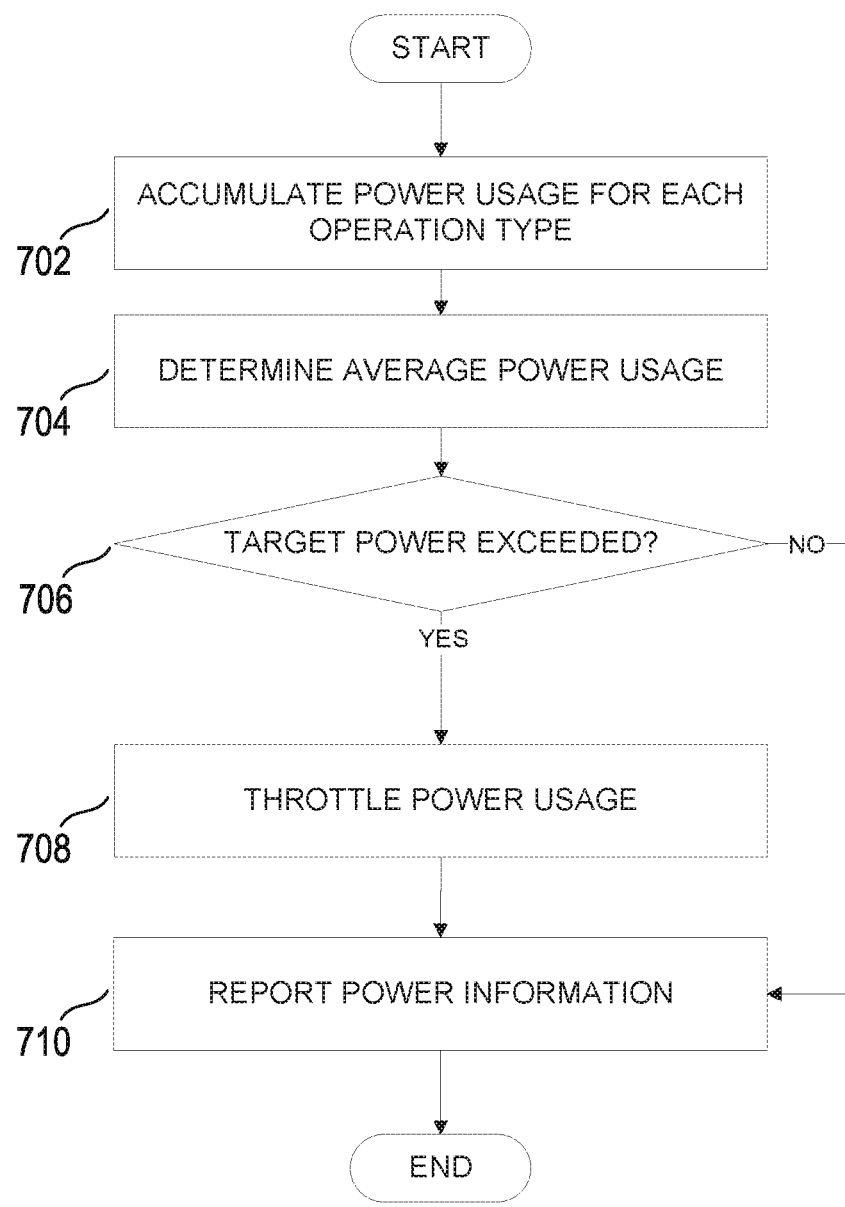
FIG. 7 illustrates a flow diagram for an example embodiment of device-aware power monitoring for a storage device.

FIG. 7 illustrates a flow diagram 700 for an example embodiment of device-aware power monitoring for a storage device. The flow diagram 700 depicts example operations that may be performed by any suitable logic and/or components, including the components described throughout this disclosure (e.g., storage devices 120 of FIG. 1, storage device 200 of FIG. 2, and/or storage device 500 of FIG. 5).

The flow diagram may begin at block 702 by accumulating the power used for each type of operation performed by the storage device. In some embodiments, for example, the storage device may include an N-energy accumulator to track the power usage for each type of operation. The N-energy accumulator may include, for example, a separate accumulator for each type of operation or work unit that may be performed by the storage device. The corresponding accumulator for a particular type of work may then be incremented, for example, when that type of work is performed by the storage device.

The flow diagram may then proceed to block 704 to determine the average power used by the storage device for a particular time interval. The average power of the storage device may be calculated, for example, based on the accumulated energy values obtained in block 702.

The flow diagram may then proceed to block 706 to determine if the average power used by the storage device exceeds the target power for the storage device. For example, the storage device may specify a target power that represents a power usage goal or threshold for the storage device. If it is determined in block 706 that the average power used by the storage device does NOT exceed the target power, the flow diagram may then proceed to block 710 to report power related information for the storage device, as described below. If it is determined in block 706 that the average power of the storage device does exceed the target power, the flow diagram may then proceed to block 708 to throttle the power used by the storage device in order to achieve the target power. For example, the storage device may perform a real-time calibration or adjustment of the size of the power credit pool.

The flow diagram may then proceed to block 710 to report power related information for the storage device. For example, power usage information, statistics, and/or events may be reported to a host computing system and/or a user.

At this point, the flow diagram may be complete. In some embodiments, however, the flow diagram may restart and/or certain blocks may be repeated. For example, in some embodiments, the flow diagram may restart at block 702 to continue monitoring, reporting, and/or throttling the power used by the storage device.

The flow diagram described in FIG. 7 is merely representative of operations that may occur in particular embodiments. In other embodiments, additional operations may be performed and/or certain operations may be omitted. Various embodiments of the present disclosure contemplate any suitable mechanisms for accomplishing the functions described herein. Some of the operations illustrated in the flow diagram of FIG. 7 may be repeated, combined, modified, and/or deleted where appropriate. Additionally, operations may be performed in any suitable order without departing from the scope of particular embodiments.

The functionality described throughout this disclosure may be represented or implemented in various forms. For example, the design of a product or component may go through various stages (e.g., from creation to simulation to fabrication) and may be represented in various forms. First, as is useful in simulations, hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software-based models of hardware, and HDL and other functional description language objects, can include register transfer language (RTL) files, among other examples. Such objects can be machine-parsable, such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of systems on a chip (SoC) and other hardware devices. In some instances, the HDL object can be used as the basis for developing models and design files that can be used by manufacturing equipment to manufacture the described hardware. Indeed, an HDL object itself can be provided as an input to manufacturing system software to cause the described hardware.

In any representation of the design, the associated data used to represent the design may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques described by the present disclosure.

As used herein, a module, component, controller, device, and/or engine may refer to any combination of hardware, software, firmware, and/or other logic. As an example, a module may include hardware (e.g., a microcontroller or application specific integrated circuit (ASIC)) associated with a non-transitory medium to store code adapted to be executed by the hardware. Therefore, in some embodiments, modules and the other terms identified above may refer to hardware that is specifically configured to recognize and/or execute code held on a non-transitory medium. Furthermore, in other embodiments, modules and the other terms identified above may refer to the non-transitory medium and associated code that is specifically adapted to be executed by the hardware to perform certain operations. In addition, modules and the other terms identified above may refer to a combination of hardware (e.g., a microcontroller or ASIC), non-transitory mediums, and code. The boundaries of modules (and the other terms identified above) often vary and potentially overlap, even though they may be illustrated as being separate. For example, a first and a second module may share hardware, software, firmware, or a combination thereof, while potentially retaining some independent hardware, software, or firmware.

Logic may be used to implement any of the functionality of the various components, such as CPU 102, processor 108, core 114, I/O controller 110, CPU memory controller 112, main memory 104, storage device 120, data storage 122, storage controller 124, power controller 126, or other components described herein. "Logic" may refer to hardware, firmware, software and/or combinations of each to perform one or more functions. In various embodiments, logic may include a microprocessor or other processing element operable to execute software instructions, discrete logic such as an application specific integrated circuit (ASIC), a programmed logic device such as a field programmable gate array (FPGA), a storage device containing instructions, combinations of logic devices (e.g., as would be found on a printed circuit board), or other suitable hardware and/or software. Logic may include one or more gates or other circuit components. In some embodiments, logic may also be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in storage devices.

Use of the phrase "to" or "configured to," in one embodiment, refers to arranging, putting together, manufacturing, offering to sell, importing and/or designing an apparatus, hardware, logic, or element to perform a designated or determined task. In this example, an apparatus or element thereof that is not operating is still "configured to" perform a designated task if it is designed, coupled, and/or interconnected to perform the designated task. As a purely illustrative example, a logic gate may provide an output of 0 or 1 during operation. However, a logic gate that is "configured to" provide a signal to enable or disable a clock, for example, does not include every potential logic gate that may provide an output of 0 or 1. Instead, the logic gate "configured to" enable or disable the clock is one that is configured and/or coupled in some manner such that its 0 or 1 output is used to enable or disable the clock. Note once again that use of the term "configured to" does not require operation, but instead focuses on the latent state of a component (e.g., an apparatus, hardware, software, module, and/or other element), such that the component is designed to perform a particular task when the component is operating.

Furthermore, use of the phrases "capable of/to," and or "operable to," in one embodiment, refers to some apparatus, logic, hardware, and/or element designed to enable use of the apparatus, logic, hardware, and/or element in a specified manner. Note that, as above, use of "to," "capable to," or "operable to," in one embodiment, refers to the latent state of an apparatus, logic, hardware, and/or element, where the apparatus, logic, hardware, and/or element is not operating but is designed to enable use of an apparatus in a specified manner.

A value, as used herein, includes any known representation of a number, a state, a logical state, or a binary logical state. Often, the use of logic levels, logic values, or logical values is also referred to as 1's and 0's, which simply represent binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value (i.e., reset), while an updated value potentially includes a low logical value (i.e., set). Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes: random-access memory (RAM), such as static RAM (SRAM) or dynamic RAM (DRAM); ROM; magnetic or optical storage medium; flash storage devices; electrical storage devices; optical storage devices; acoustical storage devices; and other forms of storage devices for holding information received from transitory (propagated) signals (e.g., carrier waves, infrared signals, digital signals).

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals). Accordingly, a machine-readable medium may include any type of tangible medium suitable for storing or transmitting electronic instructions or information in a form readable by a machine (e.g., a computer).

The following examples pertain to embodiments described throughout this disclosure.

One or more embodiments may include an apparatus comprising: a non-volatile data storage; a storage controller to: receive a command for the data storage, wherein the command comprises a plurality of stages; and dynamically allocate power for the plurality of stages of the command, wherein power for a first stage of the command is allocated first, and power for each remaining stage of the command is allocated after a preceding stage is performed.

In one example embodiment of an apparatus, the storage controller configured to dynamically allocate power for the plurality of stages of the command is further configured to: allocate power for the first stage of the command; initiate performance of the first stage of the command; allocate power for a second stage of the command; initiate performance of the second stage of the command; and release power allocated for the command.

In one example embodiment of an apparatus, the apparatus further comprises: a first interface to request a power allocation for the first stage of the command; a second interface to request a power allocation for the second stage of the command; and a third interface to request a power release for the command.

In one example embodiment of an apparatus, the storage controller configured to allocate power for the second stage of the command is further configured to adjust the power allocated for the first stage of the command.

In one example embodiment of an apparatus, power for the first stage of the command is allocated after allocating power for a second stage of one or more pending commands.

In one example embodiment of an apparatus, the command comprises a storage access operation and a data processing operation.

In one example embodiment of an apparatus, the storage controller is further configured to: determine that the first stage of the command is complete; determine that a power allocation is pending for a second stage of a different command; release the power allocated for the first stage of the command; and allocate power for the second stage of the different command.

In one example embodiment of an apparatus, the storage controller is further configured to monitor power usage for each type of operation performed by the apparatus.

In one example embodiment of an apparatus, the storage controller is further configured to: accumulate the power usage for each type of operation performed by the apparatus; determine, based on the accumulated power usage, an average power used by the apparatus; and throttle power usage when the average power exceeds a target power usage.

In one example embodiment of an apparatus, the accumulated power usage for each type of operation performed by the apparatus comprises power usage for storage access operations, data processing operations, and system event operations.

In one example embodiment of an apparatus, the storage controller is further configured to report the accumulated power usage for each type of operation performed by the apparatus.

One or more embodiments may include a method comprising: receiving a command for a storage device, wherein the command comprises a plurality of stages; and dynamically allocating power for the plurality of stages of the command, wherein power for a first stage of the command is allocated first, and power for each remaining stage of the command is allocated after a preceding stage is performed.

In one example embodiment of a method, dynamically allocating power for the plurality of stages of the command comprises: allocating power for the first stage of the command; performing the first stage of the command; allocating power for a second stage of the command; performing the second stage of the command; and releasing power allocated for the command.

In one example embodiment of a method, the method further comprises: requesting, using a first interface, a power allocation for the first stage of the command; requesting, using a second interface, a power allocation for the second stage of the command; and requesting, using a third interface, a power release for the command.

In one example embodiment of a method, allocating power for the second stage of the command comprises adjusting the power allocated for the first stage of the command.

In one example embodiment of a method, the method further comprises: determining that the first stage of the command is complete; determining that a power allocation is pending for a second stage of a different command; releasing the power allocated for the first stage of the command; and allocating power for the second stage of the different command.

In one example embodiment of a method, the method further comprises monitoring power usage for each type of operation performed by the storage device.

In one example embodiment of a method, the method further comprises: accumulating the power usage for each type of operation performed by the storage device; determining, based on the accumulated power usage, an average power used by the storage device; and throttling power usage when the average power exceeds a target power usage.

One or more embodiments may include a system comprising: a processor; a storage device comprising: a non-volatile data storage; a storage controller to: receive a command for the storage device, wherein the command comprises a plurality of stages; and dynamically allocate power for the plurality of stages of the command, wherein power for a first stage of the command is allocated first, and power for each remaining stage of the command is allocated after a preceding stage is performed.

In one example embodiment of a system, the system further comprises: a display communicatively coupled to the processor; a network interface communicatively coupled to the processor; or a battery coupled to the processor.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
   a non-volatile data storage;
   a storage controller to:
      receive a command for the data storage, wherein the command comprises a plurality of stages; and
      dynamically allocate power for the plurality of stages of the command, wherein power for a first stage of the command is allocated first, and power for each remaining stage of the command is allocated after a preceding stage is performed.

2. The apparatus of claim 1, wherein the storage controller configured to dynamically allocate power for the plurality of stages of the command is further configured to:
   allocate power for the first stage of the command;
   initiate performance of the first stage of the command;
   allocate power for a second stage of the command;
   initiate performance of the second stage of the command; and
   release power allocated for the command.

3. The apparatus of claim 2, further comprising:
   a first interface to request a power allocation for the first stage of the command;
   a second interface to request a power allocation for the second stage of the command; and
   a third interface to request a power release for the command.

4. The apparatus of claim 2, wherein the storage controller configured to allocate power for the second stage of the command is further configured to adjust the power allocated for the first stage of the command.

5. The apparatus of claim 1, wherein power for the first stage of the command is allocated after allocating power for a second stage of one or more pending commands.

6. The apparatus of claim 1, wherein the command comprises a storage access operation and a data processing operation.

7. The apparatus of claim 1, wherein the storage controller is further configured to:
determine that the first stage of the command is complete;
determine that a power allocation is pending for a second stage of a different command;
release the power allocated for the first stage of the command; and
allocate power for the second stage of the different command.

8. The apparatus of claim 1, wherein the storage controller is further configured to monitor power usage for each type of operation performed by the apparatus.

9. The apparatus of claim 8, wherein the storage controller is further configured to:
accumulate the power usage for each type of operation performed by the apparatus;
determine, based on the accumulated power usage, an average power used by the apparatus; and
throttle power usage when the average power exceeds a target power usage.

10. The apparatus of claim 9, wherein the accumulated power usage for each type of operation performed by the apparatus comprises power usage for storage access operations, data processing operations, and system event operations.

11. The apparatus of claim 9, wherein the storage controller is further configured to report the accumulated power usage for each type of operation performed by the apparatus.

12. A method comprising:
receiving a command for a storage device, wherein the command comprises a plurality of stages; and
dynamically allocating power for the plurality of stages of the command, wherein power for a first stage of the command is allocated first, and power for each remaining stage of the command is allocated after a preceding stage is performed.

13. The method of claim 12, wherein dynamically allocating power for the plurality of stages of the command comprises:
allocating power for the first stage of the command;
performing the first stage of the command;
allocating power for a second stage of the command;
performing the second stage of the command; and
releasing power allocated for the command.

14. The method of claim 13, further comprising:
requesting, using a first interface, a power allocation for the first stage of the command;
requesting, using a second interface, a power allocation for the second stage of the command; and
requesting, using a third interface, a power release for the command.

15. The method of claim 13, wherein allocating power for the second stage of the command comprises adjusting the power allocated for the first stage of the command.

16. The method of claim 12, further comprising:
determining that the first stage of the command is complete;
determining that a power allocation is pending for a second stage of a different command;
releasing the power allocated for the first stage of the command; and
allocating power for the second stage of the different command.

17. The method of claim 12, further comprising monitoring power usage for each type of operation performed by the storage device.

18. The method of claim 17, further comprising:
accumulating the power usage for each type of operation performed by the storage device;
determining, based on the accumulated power usage, an average power used by the storage device; and
throttling power usage when the average power exceeds a target power usage.

19. A system comprising:
a processor;
a storage device comprising:
a non-volatile data storage;
a storage controller to:
receive a command for the storage device, wherein the command comprises a plurality of stages; and
dynamically allocate power for the plurality of stages of the command, wherein power for a first stage of the command is allocated first, and power for each remaining stage of the command is allocated after a preceding stage is performed.

20. The system of claim 19, further comprising:
a display communicatively coupled to the processor;
a network interface communicatively coupled to the processor; or
a battery coupled to the processor.

* * * * *